April 17, 1945. J. B. GRADY 2,373,825
AIRPLANE PROPELLER
Filed Feb. 7, 1944 5 Sheets-Sheet 1

Inventor
JESSIE B. GRADY

By *Clarence A. O'Brien and Harvey B. Jacobson*
Attorneys

April 17, 1945.  J. B. GRADY  2,373,825
AIRPLANE PROPELLER
Filed Feb. 7, 1944  5 Sheets-Sheet 2

Inventor
JESSIE B. GRADY
By Clarence A. O'Brien
and Harvey B. Jacobson
Attorneys April 17, 1945. J. B. GRADY 2,373,825
AIRPLANE PROPELLER
Filed Feb. 7, 1944 5 Sheets-Sheet 4

Inventor
JESSIE B. GRADY

By Clarence A. O'Brien
and Harvey B. Jacobson
Attorneys

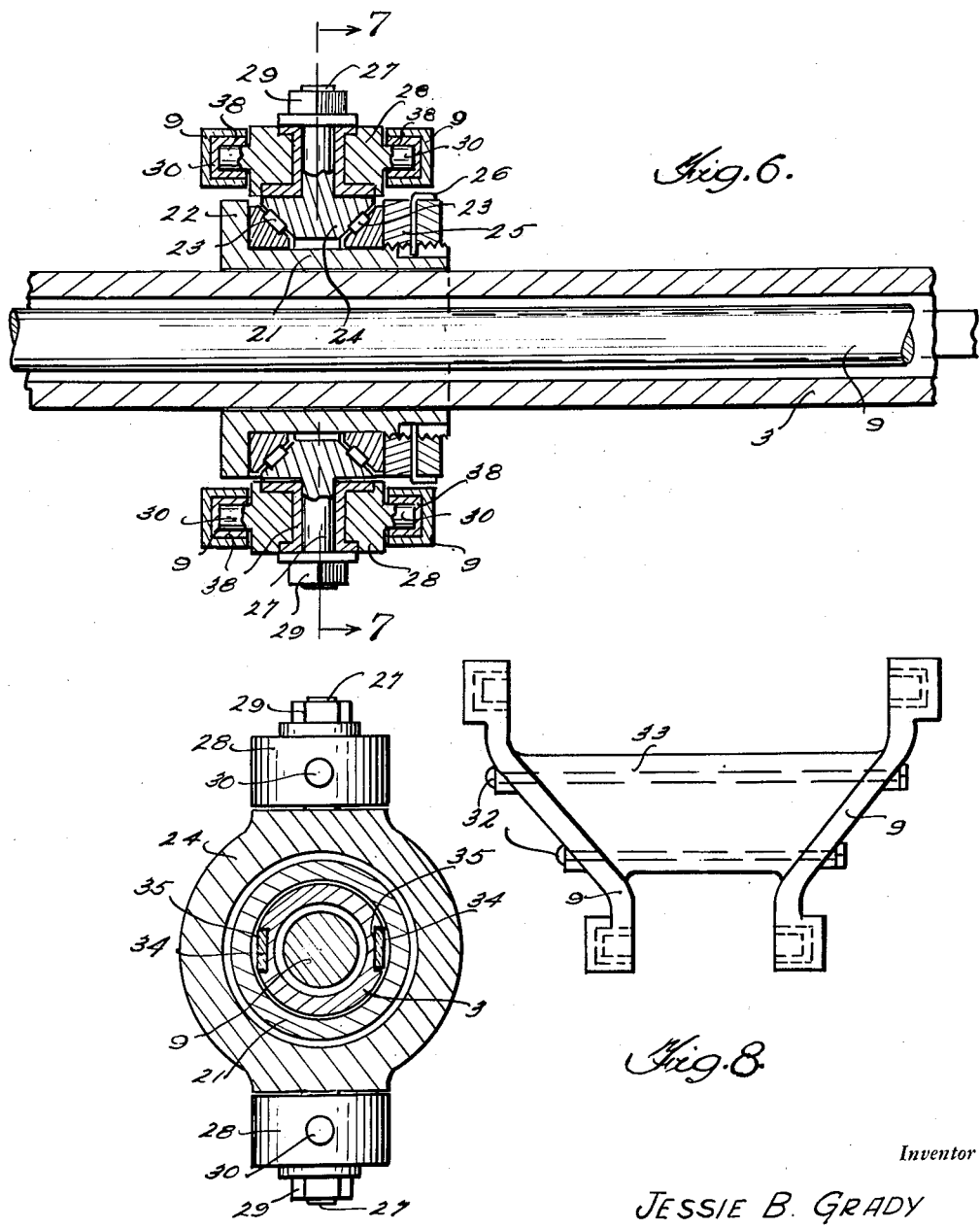

Patented Apr. 17, 1945

2,373,825

UNITED STATES PATENT OFFICE 2,373,825

AIRPLANE PROPELLER

Jessie B. Grady, Pasadena, Calif.

Application February 7, 1944, Serial No. 521,396

3 Claims. (Cl. 170—163)

The present invention relates to new and useful improvements in propellers of the variable pitch type particularly for airplanes, and has for its primary object to provide a device of this character comprising a novel construction and arrangement for feathering the blades.

Other objects of the invention are to provide a variable pitch propeller of the character described which will be comparatively simple in construction, strong, durable, highly efficient and reliable in use, compact, light in weight and which may be manufactured at low cost.

All of the foregoing, and still further objects and advantages of the invention, will become apparent from a study of the following specification, taken in connection with the accompanying drawings wherein like characters of reference designate corresponding parts throughout the several views, and wherein:

Figure 6 is a view in longitudinal section, taken substantially on the line 6—6 of Figure 5.

Figure 7 is a cross sectional view, taken substantially on the line 7—7 of Figure 6.

Figure 8 is a view in elevation of one of the link assemblies.

Figure 1:
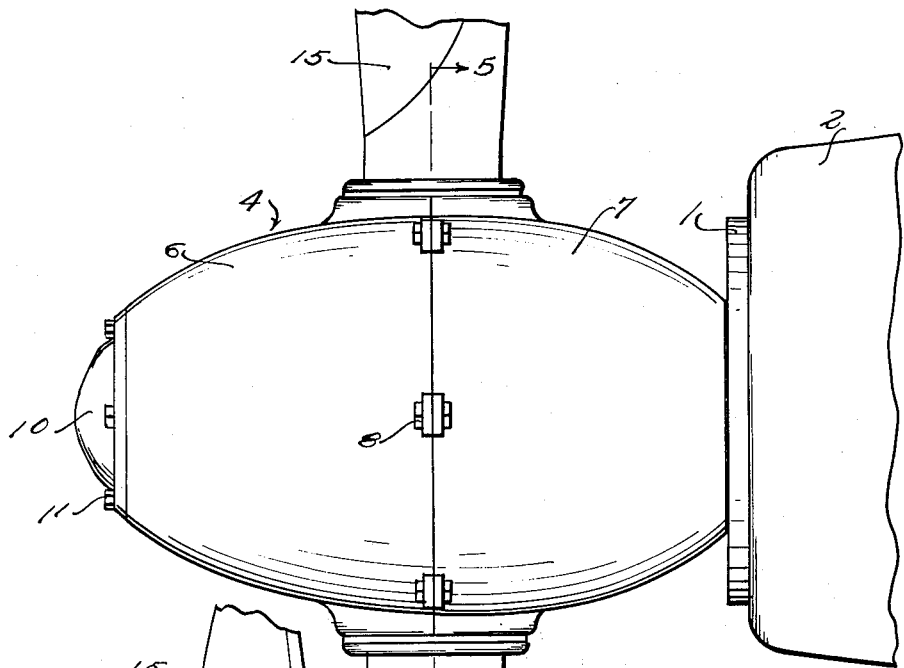
Figure 1 is a view in side elevation of a variable pitch propeller constructed in accordance with the present invention.
Figure 2:
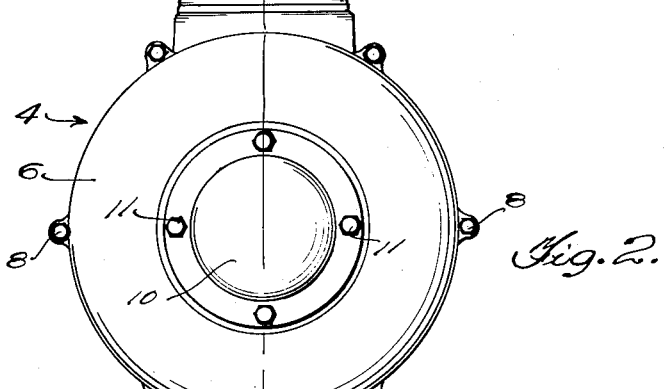
Figure 2 is a view in front elevation thereof.
Figure 3:
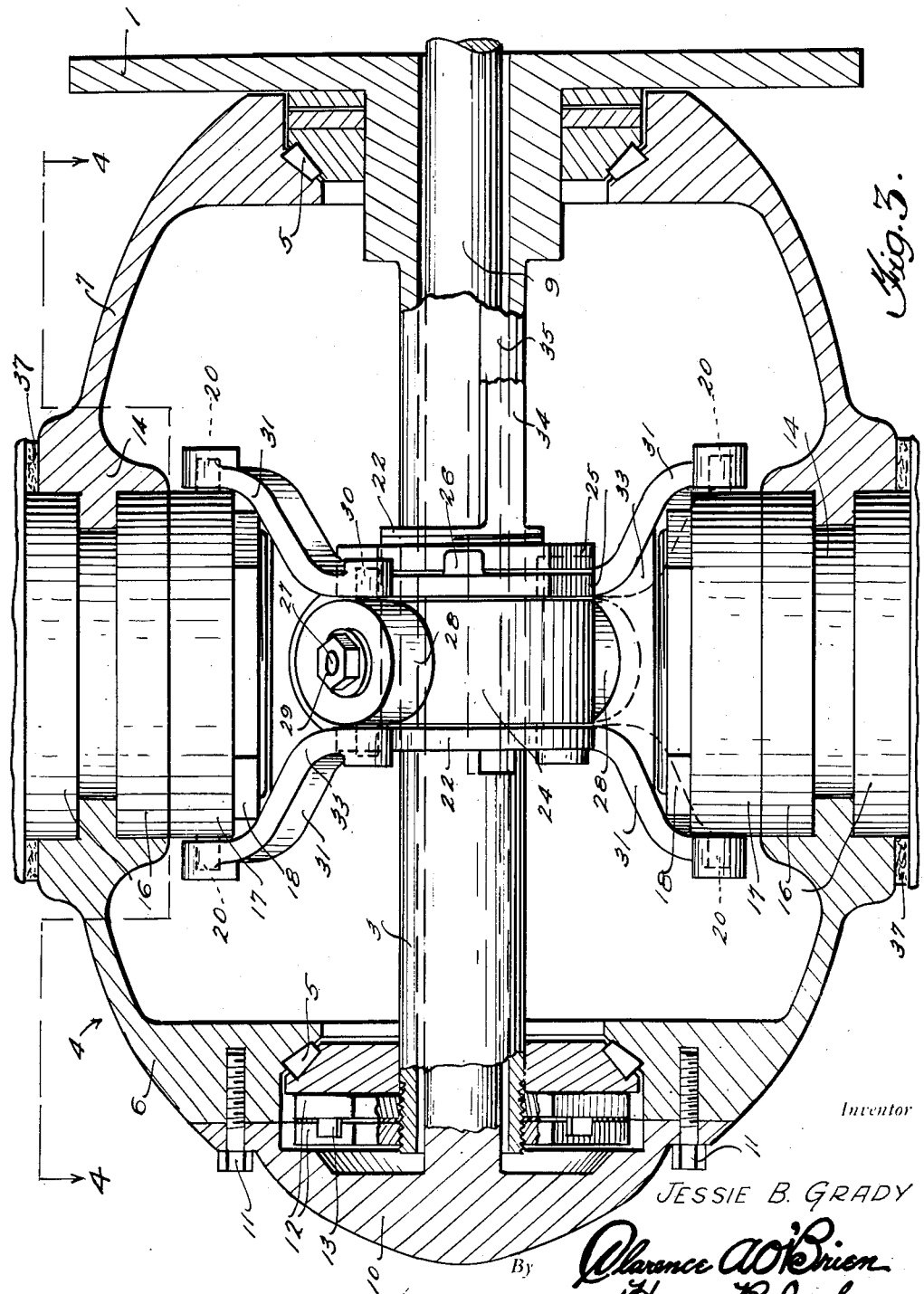
Figure 3 is a view in vertical longitudinal section, taken substantially on the line 3—3 of Figure 2.
Figure 4:
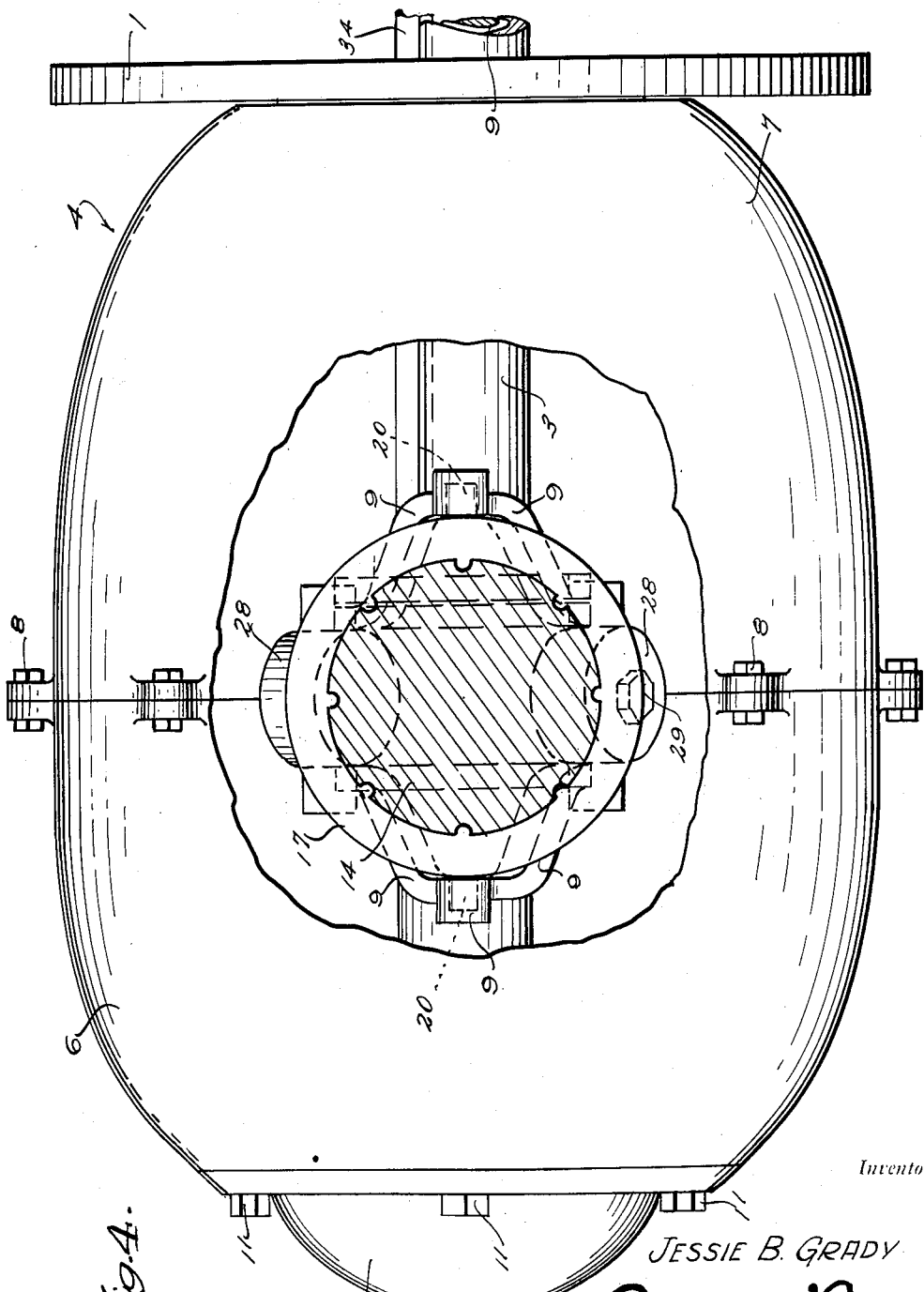
Figure 4 is a top plan view with a portion broken away in horizontal section substantially on the line 4—4 of Figure 3.
Figure 5:
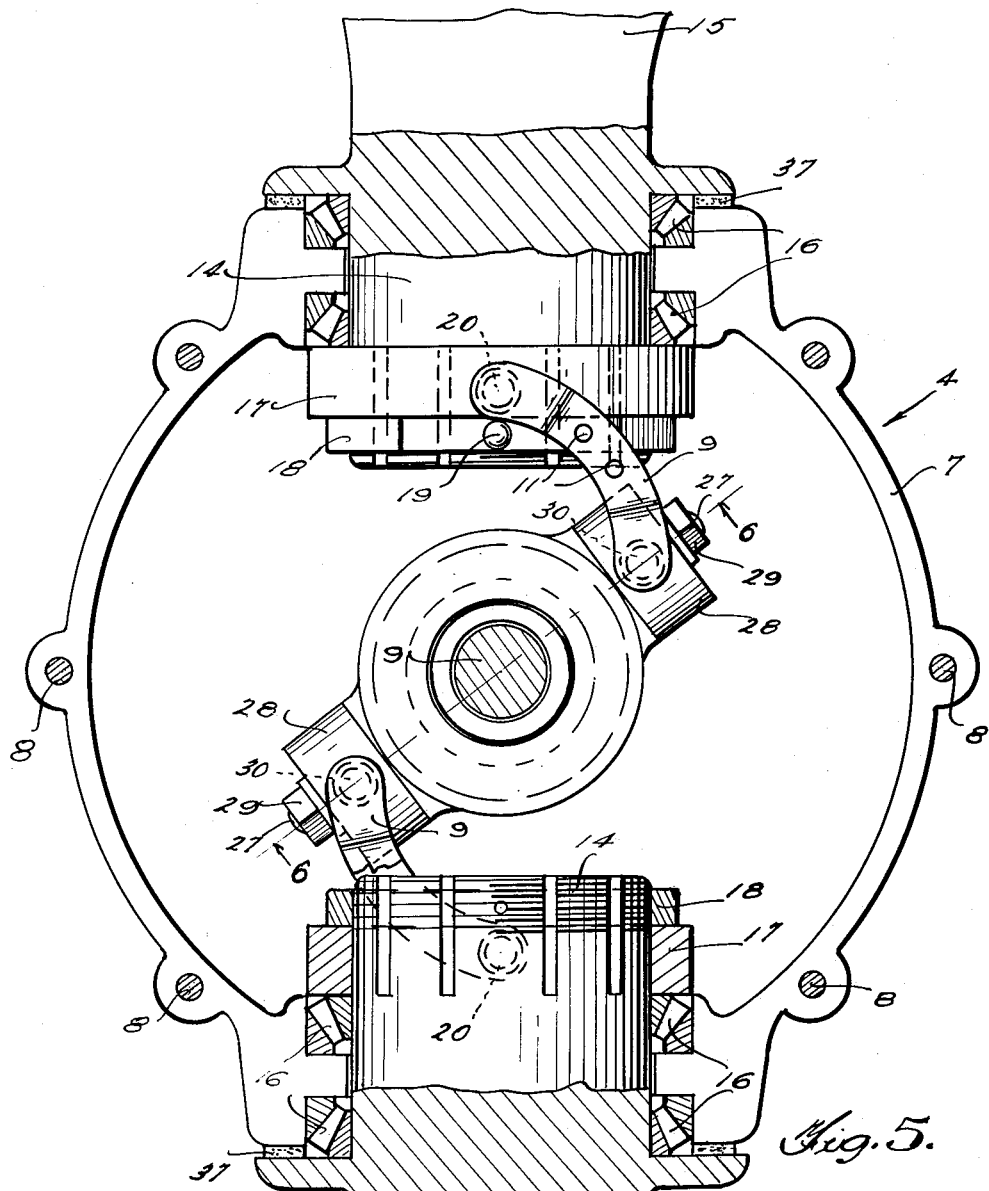
Figure 5 is a cross sectional view, taken substantially on the line 5—5 of Figure 1.

Referring now to the drawings in detail, it will be seen that the embodiment of the invention which has been illustrated comprises a flange 1 which is rigidly secured in any suitable manner to the nose 2 of a plane. Projecting forwardly from the flange 1 is a tubular spindle 3 which is open at both ends. A housing 4 is mounted for rotation on the spindle 3. Roller bearings 5 are provided for the housing 4. The housing 4, which constitutes the hub of the propeller, comprises complemental front and back sections 6 and 7, respectively, which are detachably bolted together at 8.

Extending rotatably through the tubular spindle 3 is a propeller shaft 9 from the power plant of the plane. The shaft 9 is provided, at its forward end, with a nose or cap 10. The cap 10 is bolted at 11 to the forward end of the housing 4, thus connecting said housing to the shaft 9 for actuation thereby. Retaining nuts 12 are threaded on the forward end portion of the tubular spindle 3 for the front bearing 5 and the housing 4. A lock washer 13 is provided between the nuts 12.

The stems 14 of blades 15 are journaled in roller bearings 16 which are provided therefor in the housing 4. Collars 17 are splined on the inner end portions of the stems 14 and engaged beneath the inner bearings 16. Retaining nuts 18 for the collars 17 are threaded on the stems 14. Tapered pins 19 are driven into the nuts 18 and the stems 14 for preventing loosening of said nuts. Trunnions 20 project from the collar 17.

Mounted for longitudinal sliding movement on the tubular spindle 3 is a sleeve 21 comprising a flange 22 on its forward end. Journaled on roller bearings 23 on the sleeve 21 is a ring 24. The rear end portion of the sleeve 21 is threaded to receive retaining nuts 25 for the bearings 23 and the ring 24. A lock washer 26 is provided between the nuts 25.

Stub shafts 27 radiate from the ring 24. Rings or collars 28 are journaled on the stub shafts 27 and retained by nuts 29. Trunnions 30 radiate from the collars 28. Pairs of links 31 have their end portions journaled on the trunnions 20 and 30 for connecting the blade stems 14 to the sleeve 21 for rotation thereby upon longitudinal sliding movement of said sleeve on the tubular spindle 3. The pairs of links 31 are secured together by bolts 32 with spacers 33 therebetween.

Operating bars 34 extend rearwardly from the sleeve 21. The bars 34 are slidable in longitudinal ways 35 which are provided therefor in the tubular spindle 3 and which pass through the flange 1. The bars 34 extend rearwardly to be operated in any suitable manner from the cockpit or control cabin of the plane by the pilot.

It is thought that the operation of the invention will be readily apparent from a consideration of the foregoing. Briefly, the hub assembly is driven from the power plant of the plane through the shaft 9 and the cap 10 thereon bolted at 11 to the housing 4. To increase or decrease the pitch of the blades 15, the sleeve 21 is shifted longitudinally on the tubular spindle 3 through the medium of the bars 34. When this occurs, the links 31 turn the collars 17 which are fixed on the stems 14 of the blades 15. Rotation of the ring 24 on the sleeve 21 and the collars 28 on the stub shafts 27 permits operation of the links 31 in a manner to rotate the stems 14. The housing 4 is adapted to receive a suitable lubricant for the operating mechanism therein. Sealing rings or gaskets 37 prevent loss of the lubricant around the stems 14 of the propeller blades 15. Bronze bearings 38 are provided for the members 9, 28, et cetera.

It is believed that the many advantages of a variable pitch propeller constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A propeller comprising a tubular spindle, means on one end of the spindle for mounting same on a support, a housing journaled on the spindle, a drive shaft extending rotatably through the spindle and secured at one end to the housing for rotating same, blades rotatably mounted in the housing, a sleeve slidable on the tubular spindle, means for actuating said sleeve, and means operatively connecting the blades to the sleeve for rotation thereby.

2. A propeller comprising a tubular spindle, means on one end of the spindle for mounting same on a support, a housing journaled on the spindle, a drive shaft extending rotatably through the spindle and secured at one end to the housing for rotating same, blades rotatably mounted in the housing, a sleeve slidable on the tubular spindle, means for actuating said sleeve, and means operatively connecting the blades to the sleeve for rotation thereby, the last-named means including a ring rotatably mounted on the sleeve, collars rotatably mounted on said ring, and links having one end pivotally connected to the collars and their other ends pivotally connected to the blades.

3. A propeller of the character described comprising a flange for mounting on the nose of an airplane, a tubular spindle projecting from said flange, spaced bearings on said spindle, a housing journaled on said bearings, a drive shaft extending rotatably through the spindle, a cap on one end of the drive shaft secured to the housing for connecting said housing to the drive shaft for actuation thereby, a plurality of blades including stems journaled in the housing, collars fixed on said stem, a sleeve slidable on the tubular spindle, a ring rotatably mounted on said sleeve, stub shafts radiating from the ring, collars journaled on said stub shafts, pairs of links having one end pivotally connected to the first-named collars and their other ends pivotally connected to the second-named collars, and means for shifting the sleeve longitudinally on the tubular spindle for rotating the first-named collars for feathering the blades.

JESSIE B. GRADY.